US 012207598B2

(12) United States Patent
Van De Mortel

(10) Patent No.: US 12,207,598 B2
(45) Date of Patent: Jan. 28, 2025

(54) SYSTEM FOR MULTI-AXIS SELF-CLIMBING TREE TRIMMER

(71) Applicant: VANDYPALM, INC., Irvine, CA (US)

(72) Inventor: Mike Van De Mortel, Yorba Linda, CA (US)

(*) Notice: Subject to any disclaimer, the term of this patent is extended or adjusted under 35 U.S.C. 154(b) by 155 days.

(21) Appl. No.: 17/859,997

(22) Filed: Jul. 7, 2022

(65) Prior Publication Data

US 2024/0008429 A1 Jan. 11, 2024

(51) Int. Cl.
*A01G 23/095* (2006.01)
(52) U.S. Cl.
CPC .................. *A01G 23/0955* (2013.01)
(58) Field of Classification Search
CPC .................................................. A01G 23/0955
See application file for complete search history.

(56) References Cited

U.S. PATENT DOCUMENTS

| | | | | |
|---|---|---|---|---|
| 4,735,244 A | * | 4/1988 | Kacer, Sr. | A01G 23/0955 144/24.13 |
| 5,056,258 A | * | 10/1991 | Quinn | A01G 23/0955 47/8 |
| 6,474,377 B1 | | 11/2002 | Van De Mortel | |
| 8,517,066 B1 | | 8/2013 | Van De Mortel et al. | |
| 9,445,554 B2 | | 9/2016 | Van De Mortel et al. | |

FOREIGN PATENT DOCUMENTS

RU 202101 U1 * 2/2021 ............. A01G 23/08

OTHER PUBLICATIONS

English translate (RU202101U1), retrieved date Apr. 1, 2024.*

* cited by examiner

*Primary Examiner* — Mohammed S. Alawadi
(74) *Attorney, Agent, or Firm* — Camuti Law Group, APC; Nathan Camuti

(57) ABSTRACT

A system for multi-axis self-climbing tree trimmer including a self-climbing platform, a motorized carrier, and a trimming portion. The trimming portion includes a base, an actuator with an extendable piston, one or more articulating arms having a curved configuration to receive a tree trunk or to form a central opening to substantially encircle a tree trunk. Each articulating arm includes one or more interchangeable cutting tools for tree trimming and one or more cut depth control elements for controlling the depth of engagement of the cutting tools. The base may include a wheel element to indicate pressure exerted by the actuator. The extendable piston is coupled to the articulating arms, wherein when the extendable piston extends, the articulating arms move to an open configuration, and when the extendable piston retracts, the articulating arms move to a closed configuration, and the articulating arms may move independently of each other.

18 Claims, 7 Drawing Sheets

SYSTEM FOR MULTI-AXIS SELF-CLIMBING TREE TRIMMER

CROSS-REFERENCES TO RELATED APPLICATIONS

The present application is generally related to the following applications: U.S. Pat. No. 9,445,554 entitled "Multi-Axis Controlled Self-Climbing Tree Trimmer", U.S. Pat. No. 8,517,066 entitled "Multi-Axis Controlled Self-Climbing Tree Trimmer", and U.S. Pat. No. 6,474,377 entitled "Self-Propelled Climbing Tree Trimmer", the disclosures of which are incorporated herein by reference in their entirety.

BACKGROUND

Trimming and removing fronds and peripheral growth from palm trees and cycads is tedious and dangerous. Generally, trimming palm trees may involve donning climbing equipment to physically climb up the tree to manually cut the sharp fronds. Other ways to trim may involve riding a hydraulic lift to reach the top of the trees for manual trimming. Needless to say, trimming such trees is labor intensive and costs of equipment, gear, and potential liability are high. Various devices that have been developed for remote tree trimming present various problems, including lacking stability in climbing, uneven cutting, to name a few. There is a need for a system for a self-climbing tree trimmer that addresses such problems and also provides additional features.

SUMMARY

The present disclosure is directed to systems for multi-axis self-climbing tree trimmer, substantially as shown in and/or described in connection with at least one of the figures, as set forth more completely in the claims.

DETAILED DESCRIPTION

Figure 1:
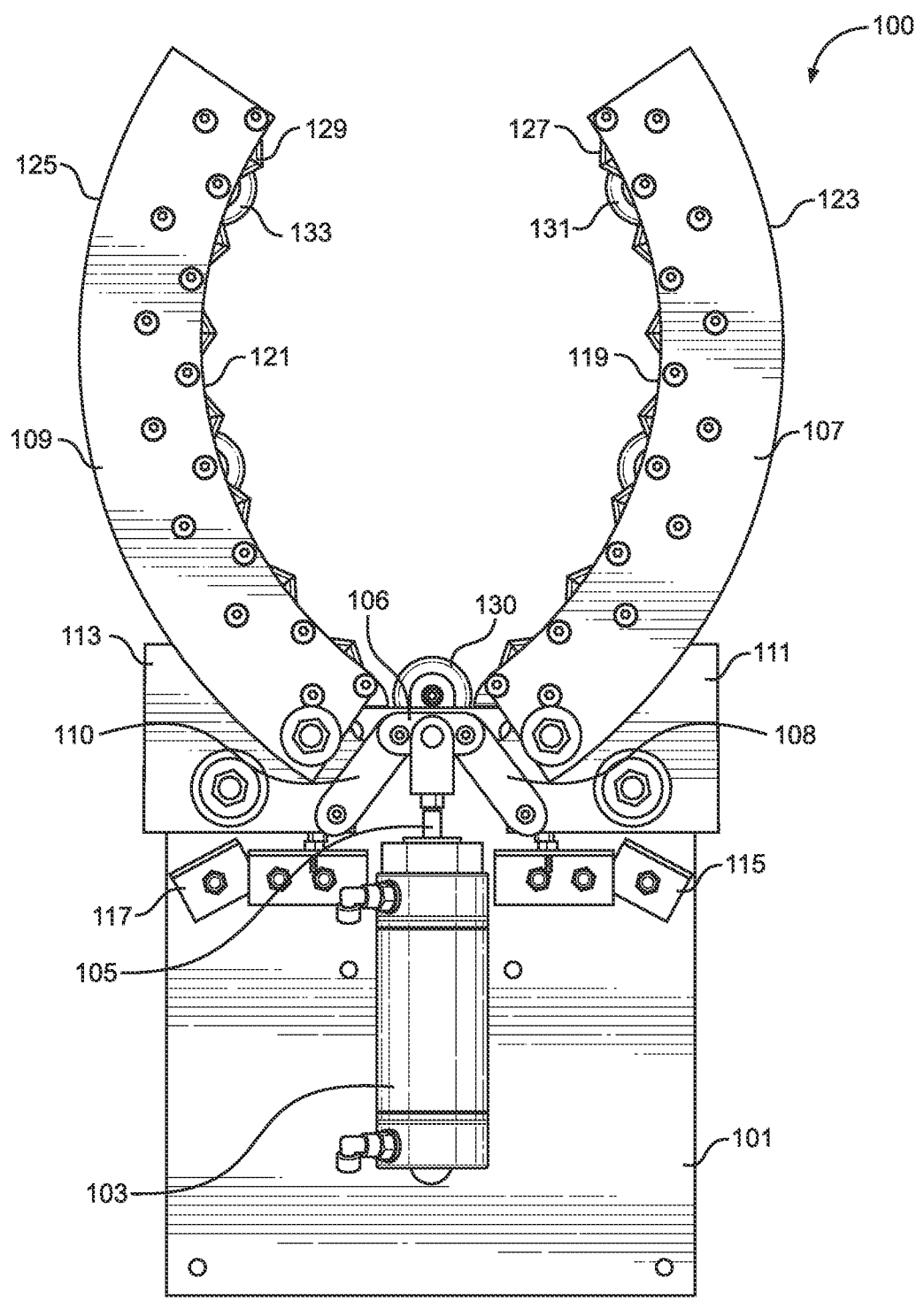
FIG. 1 shows a diagram of an exemplary trimming portion of a system for multi-axis self-climbing tree trimmer in a closed configuration, according to one embodiment of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale and are not intended to correspond to actual relative dimensions.

FIG. 1 shows a diagram of an exemplary trimming portion of a system for multi-axis self-climbing tree trimmer in a closed configuration, according to one embodiment of the present disclosure. As depicted, trimming portion 100 is in a closed configuration. In the depicted embodiment, trimming portion 100 includes base 101, actuator 103 having extendable piston element 105, first articulating arm 107, and second articulating arm 109. In some embodiments, actuator 103 having extendable piston element 105 is attached to base 101. As depicted in FIG. 1, extendable piston element 105 is in a retracted position. Actuator 103 may be one of a pneumatic cylinder and a hydraulic cylinder. In some embodiments, base 101 also includes bracket elements 115 and bracket element 117. Additionally, in some embodiments, wheel element 130 may be attached to base 101. In some embodiments, first articulating arm 107 and second articulating arm 109 are pivotally attached to base 101 and connected to an end of extendable piston element 105.

In some embodiments, articulating arm 107 and articulating arm 109 may be pivotally attached directly to base 101 and connected to an end of extendable piston element 105 such that articulating arm 107 and articulating arm 109 may pivot or move independently of each other. In the depicted embodiment, a first end of first articulating arm 107 is coupled to first pivoting connector plate 111, and a first end of second articulating arm 109 is coupled to second pivoting connector plate 113, wherein first pivoting connector plate 111 and second pivoting connector plate 113 are each coupled to base 101 using a pivoting connector, such as a bolt, allowing pivoting connector plate 111 and pivoting connector plate 113 may pivot or move independently of each other. Additionally, in the depicted embodiment, an end of extendable piston element 105 is coupled to first pivoting connector plate 111 and second pivoting connector plate 113. In some embodiments, articulating arm 107 and articulating arm 109 are attached to pivoting connector plate 111 and pivoting connector plate 113, respectively.

In some embodiments, first articulating arm 107 and second articulating arm 109 may each have a curved configuration including concave edge 119 and concave edge 121, respectively, and convex edge 123, convex edge 125, respectively. As depicted in FIG. 1, one or more cutting tools 127, 129 may extend from concave edge 119 and concave edge 121 to engage a portion of a tree to be trimmed. In some embodiments, a cutting side of articulating arm 107 is concave edge 119 from which cutting tool 127 extends. In the depicted embodiment, second articulating arm 109 is positioned opposite first articulating arm 107 such that articulating arms 107 and 109 form a central opening and are moveable between an open configuration and a closed configuration, wherein in the open configuration, a trunk of a tree is receivable within the central opening, and wherein in the closed configuration, first articulating arm 107 and second articulating arm 109 engage the tree trunk for trimming. Furthermore, in some embodiments, one or more cut depth control elements 131, 133 may extend from concave edge 119, 121, respectively, to control a cut depth and eliminate resistance from articulating arms 107, 109 so that rotational friction comes from one or more cutting tools 127, 129 cutting into a tree trunk or adjacent peripheral growth.

The depicted embodiment of FIG. 1 shows trimming portion 100 of the present disclosure having articulating arm 107 and articulating arm 109. In some embodiments, trimming portion 100 of the present disclosure may have one articulating arm. In some embodiments, trimming portion 100 of the present disclosure may have more than two articulating arms. In some embodiments, wherein trimming portion 100 has one articulating arm, when extendable piston element 105 is in a retracted configuration, the cutting side of the articulating arm is in an open configuration, and when extendable piston element 105 is in an extended configuration, the cutting side of the articulating arm is in a closed position. In some embodiments, wherein trimming portion 100 has one articulating arm, when extendable piston element 105 is in a retracted configuration, the cutting side of the articulating arm is in a closed configuration, and when extendable piston element 105 is in an extended configuration, the cutting side of the articulating arm is in an open position. In some embodiments, wherein trimming portion 100 has one articulating arm that maintains the same configuration when extendable piston element 105 is in an extended configuration and when extendable piston element 105 is in a retracted configuration.

The depicted embodiment of FIG. 1 shows extendable piston element 105 pivotally connected to connecting bar 106. The pivotal connection may allow independent motion of first articulating arm 107 and second articulating arm 109. The independent articulation of first articulating arm 107 and second articulating arm 109 may allow asymmetrical motion among the articulating arms and enable first articulating arm 107 and second articulating arm 109 to operate on trees with non-circular trunks. In some embodiments, independently articulating arms may allow trimming portion 100 to move independently from each other allowing trimming portion 100 to be used to trim trees with asymmetrical variance in the size, shape, or orientation of various portions of the tree being trimmed. In other embodiments, connecting bar 106 may be fixedly connected to extendable piston element 105.

The depicted embodiment of FIG. 1 shows articulating element 108 and articulating element 110 pivotally connected to opposing ends of connecting bar 106. Each of articulating element 108 and articulating element 110 extend from a first end that is pivotally connected to connecting bar 106 to a second end that is pivotally connected to first pivoting connector plate 111 and second pivoting connector plate 113, respectively. The connection between connecting bar 106, articulating element 108 and articulating element 110, and first pivoting connector plate 111 and second pivoting connector plate 113 configure trimming portion 100 to open when extendable piston element 105 is extended, where open means first articulating arm 107 and second articulating arm 109 are in a disengaged configuration maximizing the central opening between their respective terminal ends, and configure trimming portion 100 to close when extendable piston element 105 is retracted, where closed means first articulating arm 107 and second articulating arm 109 are in an engaged configuration positioning the cutting tools of first articulating arm 107 and second articulating arm 109 to engage with a tree trunk for trimming. Bracket element 115 and bracket element 117 may limit the range of motion of trimming portion 100.

Figure 2:
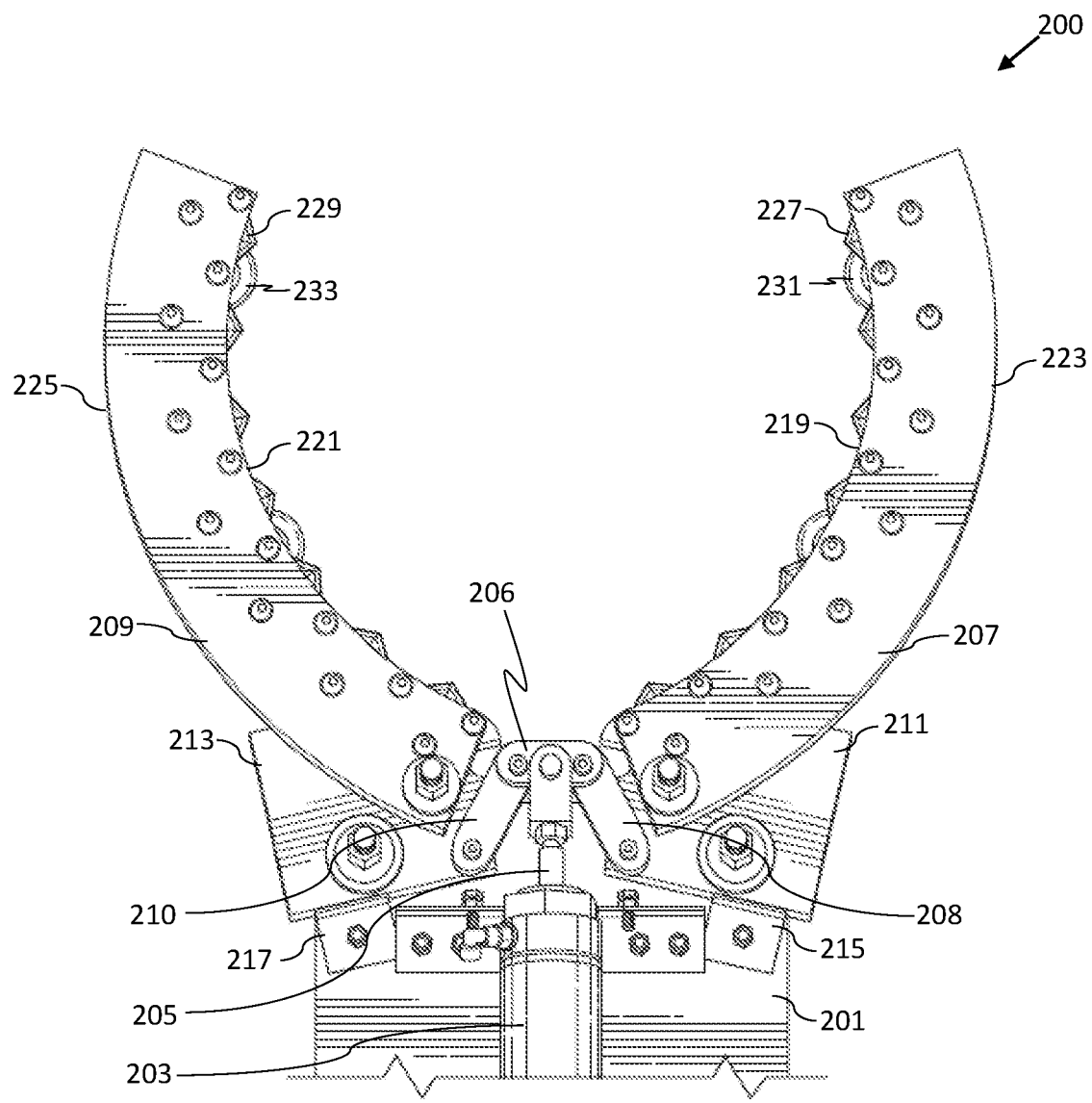
FIG. 2 shows a diagram of an exemplary trimming portion of a system for multi-axis self-climbing tree trimmer in an open configuration, according to one embodiment of the present disclosure.

FIG. 2 shows a diagram of an exemplary trimming portion of a system for multi-axis self-climbing tree trimmer in an open configuration, according to one embodiment of the present disclosure. As depicted, trimming portion 200 is in an open configuration. In the depicted embodiment, extendable piston element 205 is in an extended configuration. As shown in FIG. 2, when extendable piston element 205 extends, first articulating arm 207 and second articulating arm 209 move to an open configuration, and when extendable piston element 205 retracts, first articulating arm 207 and second articulating arm 209 move to a closed configuration so that the cutting tool 227 and 229 engage with a surface of a tree trunk. FIG. 2 shows actuator 203, connecting bar 206, articulating element 208, articulating element 210, concave edge 219, concave edge 221, convex edge 223, convex edge 225, and depth control elements 231 and 233.

As depicted, first articulating arm 207 and second articulating arm 209 may move independently of each other. First articulating arm 207 and second articulating arm 209 moving independently of each other may better accommodate any unevenness and/or asymmetry of the surface of a tree trunk, enabling one or more cutting tools 227, 229 to better engage with a surface of the tree trunk for trimming. As depicted in FIG. 2, base 201 may include one or more bracket elements 215, 217 to limit the open configuration of first articulating arm 207 and second articulating arm 209 at a maximum aperture. In the depicted embodiment, first articulating arm 207 is coupled to first pivoting connector plate 211, and second articulating arm 209 is coupled to second pivoting connector plate 213. In the depicted embodiment an end of extendable piston element 205 is coupled to first pivoting connector plate 211 and second pivoting connector plate 215. As depicted, when extendable piston element 205 is extended, both pivoting connector plates 211, 213 pivot, thereby causing first articulating arm 207 and second articulating arm 209 to also pivot and move as each articulating arm 207, 209 is coupled to a respective connector plate 211, 213.

As shown in FIG. 2, bracket element 215 and bracket element 217 limit a maximum angle at which connector plate 211 and connector plate 213 may pivot by blocking connector plate 211 and connector plate 213 from further movement after they have rotated through an opening angle. Consequently, as shown, the central opening formed by first articulating arm 207 and second articulating arm 209 in open configuration has a maximum aperture to receive a tree trunk. In some embodiments, the opening angle may be an acute angle, a right angle, or an obtuse angle. In some embodiments, first articulating arm 207 and second articulating arm 209 are coupled to an end of extendable piston element 205 and base 201.

Figure 3:
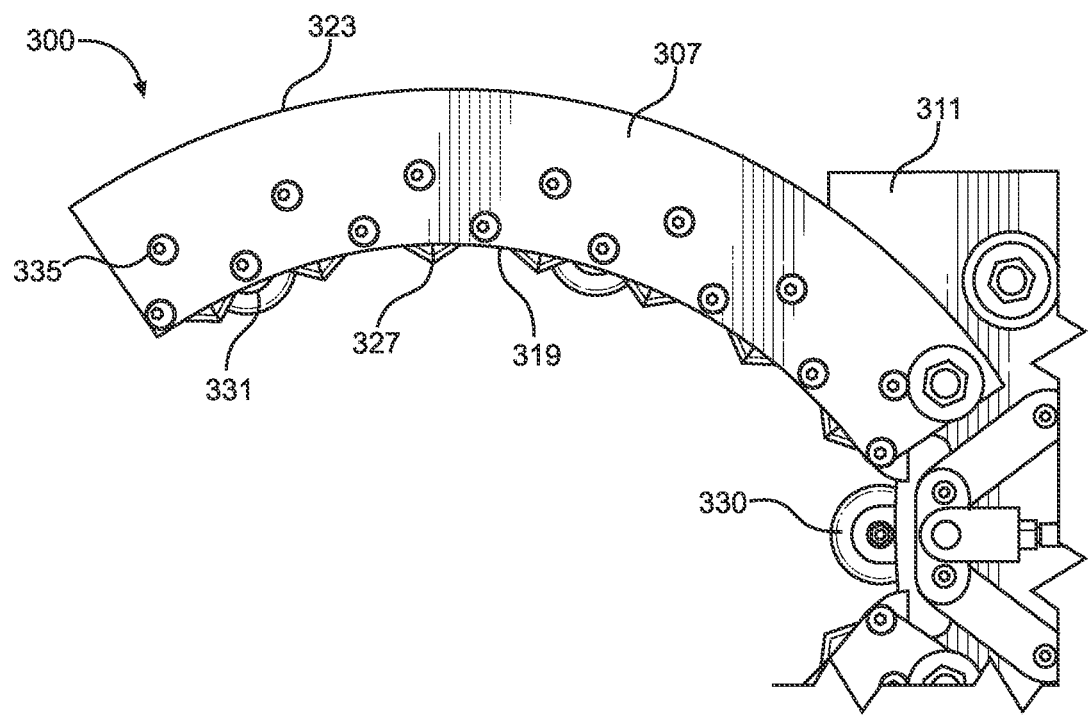
FIG. 3 shows a diagram of a top perspective view of an exemplary articulating arm of trimming portion of a system for multi-axis self-climbing tree trimmer, according to one embodiment of the present disclosure.

FIG. 3 shows a diagram of a top detail view of an exemplary articulating arm of the trimming portion of a system for multi-axis self-climbing tree trimmer, according to one embodiment of the present disclosure. Diagram 300 shows articulating arm 307 has an arch shape with concave edge 319 and convex edge 323. In the depicted embodiment, one or more cutting tools, including cutting tool 327, and one or more cut depth control elements, including depth control element 331, extend from concave edge 319. In some embodiments, depth control element 331 may be a wheel mounted to articulating arm 307. Control element 331 may control the depth to which cutting tool 327 may pierce the trunk of a tree being trimmed. The cutting depth may be adjusted based on the extent to which depth control element 331 extends past concave edge 319. Adjusting the cutting depth may be accomplished by choosing a depth control element with an appropriate radius, or my adjusting the mounting position of depth control element 331. Additionally, the cutting depth is affected by the distance cutting tool 327 extends past concave edge 319. The cutting depth may be determined by the distance cutting element 327 extends that is greater that the distance depth control element 331 extends past concave edge 319. Depth control element may be a wheel formed from metal, plastic, polyurethane, rubber, or ceramic.

In the depicted embodiment, articulating arm 307 includes a plurality of fasteners, such as fastener 335. In some embodiments, articulating arm 307 is comprised of two metal plates including an upper plate and a lower plate (not shown). In some embodiments, arm screws 335 may be threadably engaged with the bottom plate of articulating arm 307, allowing an increasing retention force to be applied by increasing the torque applied to each securing element. Each cutting tool may be formed by a cutting blade and may be replaced independently from each of the other cutting tools of articulating arm 307. As depicted in FIG. 3, each cutting tool comprises two cutting blades with a cutting edge presented to concave edge 319 of articulating arm 307 and a non-cutting side abutted with the non-cutting side of the corresponding cutting blade. In some embodiments, the cutting blades may be trapezoidal razor blades, e.g., a blade from a box cutter. FIG. 3 shows connector plate 311 and wheel element 330.

Figure 4:
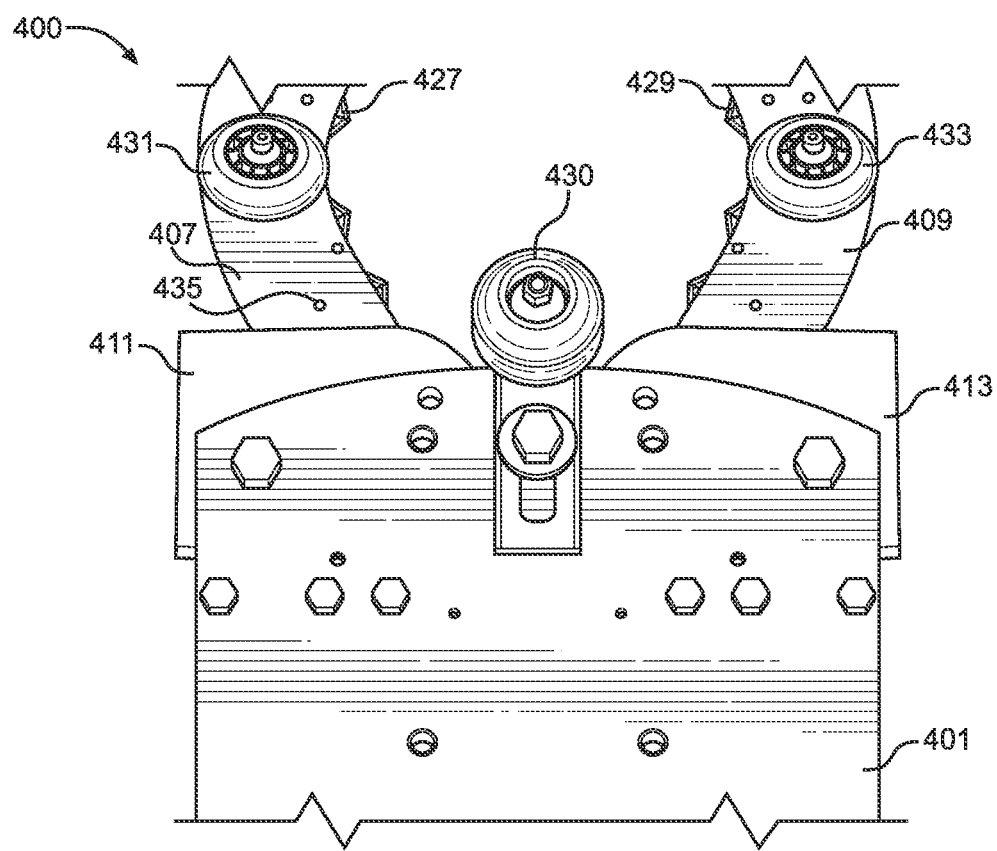
FIG. 4 shows a diagram of a bottom perspective view of an exemplary base of trimming portion of a system for multi-axis self-climbing tree trimmer, according to one embodiment of the present disclosure.

FIG. 4 shows a diagram of a bottom view of an exemplary base of trimming portion of a system for multi-axis self-climbing tree trimmer, according to one embodiment of the present disclosure. In the depicted embodiment, wheel element 430 protrudes from one end of the base and depicted wheel element 430 is attached to underside of base 401. Wheel element 430 contacts the true of the tree when trimming portion 400 is deployed for trimming. In some embodiments, the distance that wheel element 430 protrudes or extends from base 401 is adjustable. In some embodiments, wheel element 430 may serve as an indicator of pressure exerted by actuator (not pictured). As a result, in some embodiments, the pressure of the actuator can be adjusted to control the amount of force that extendable piston element (not pictured) is exerting. In some embodiments, wheel element 430 may serve a shock absorption purpose and controls parts of trimming portion 400, such as base 401 and pivoting connector plate 411 and pivoting connector plate 413, from directly hitting the tree being trimmed, thereby maximizing contact of cutting tools 427 and 429 with the trunk of the tree for trimming. In the depicted embodiment, the width of wheel element 430 is greater than the width of cut depth control element 431 and cut depth control element 433. The wider width of wheel element 430 may absorb more shock than a narrow-width wheel.

Also depicted in FIG. 4 are cut depth control element 431 and cut depth control element 433, which are attached to the underside of articulating arm 407 and articulating arm 409, respectively. In some embodiments, cut depth control element 431 and cut depth control element 433 control a depth the cutting tools engage the portion of the tree to be trimmed. In some embodiments, articulating arm 407 and articulating arm 409 may comprise one or more cut depth control elements to minimize or eliminate resistance such that rotational friction comes from the plurality of cutting tools cutting into the tree trunk or adjacent peripheral growth.

Figure 5:
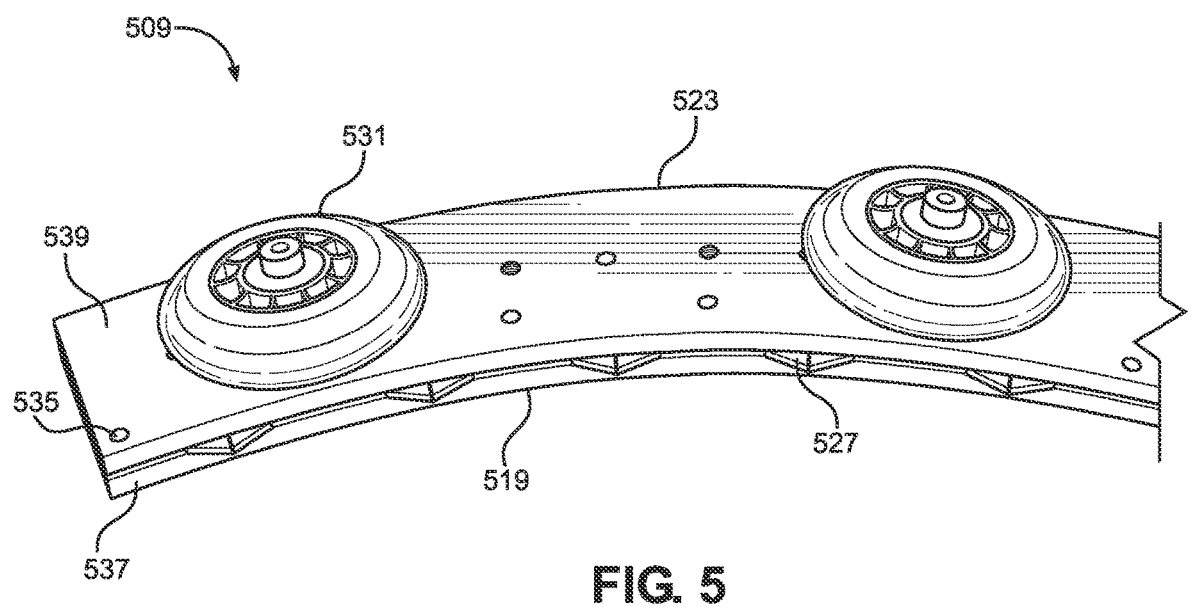
FIG. 5 depicts a diagram of a bottom perspective view of an exemplary articulating arm of a system for multi-axis self-climbing tree trimmer, according to one embodiment of the present disclosure.

FIG. 5 depicts a diagram of a bottom detail view of an exemplary articulating arm of a system for multi-axis self-climbing tree trimmer, according to one embodiment of the present disclosure. As depicted, articulating arm 509 is comprised of lower plate 539 and upper plate 537 coupled together with a plurality of fasteners 535. FIG. 5 shows convex edge 523 of articulating arm 509.

In the depicted embodiment, a first end of the one or more cutting tools 527 is sandwiched between lower plate 539 and upper plate 537, and a second end of the one or more cutting tools 527 extends from concave edge 519 of articulating arm 509. In the depicted embodiment, concave edge 519 is an inner curve of articulating arm 509. In some embodiments, cutting tools 527 are removable after loosening one or more screws 535 such that cutting tools 527 are replaceable or interchangeable.

In some embodiments, cutting tools 527 may include different types of blades, including box cutters, snap-off blades, razor blades, and the like. In other embodiments, cutting tools 527 may include a slicer, a cutter, a grinder, a carver, a router, a sander, a peeler, a rasp, and an abrader, a laser cutting tool, an etching tool, a burning tool, or any combination thereof. Also depicted in FIG. 5 is cut depth control element 531. The narrow or slim width of cut depth control element 531 may minimize the friction and facilitate engagement and contact of cutting tools 527 with a tree trunk for trimming.

Figure 6:
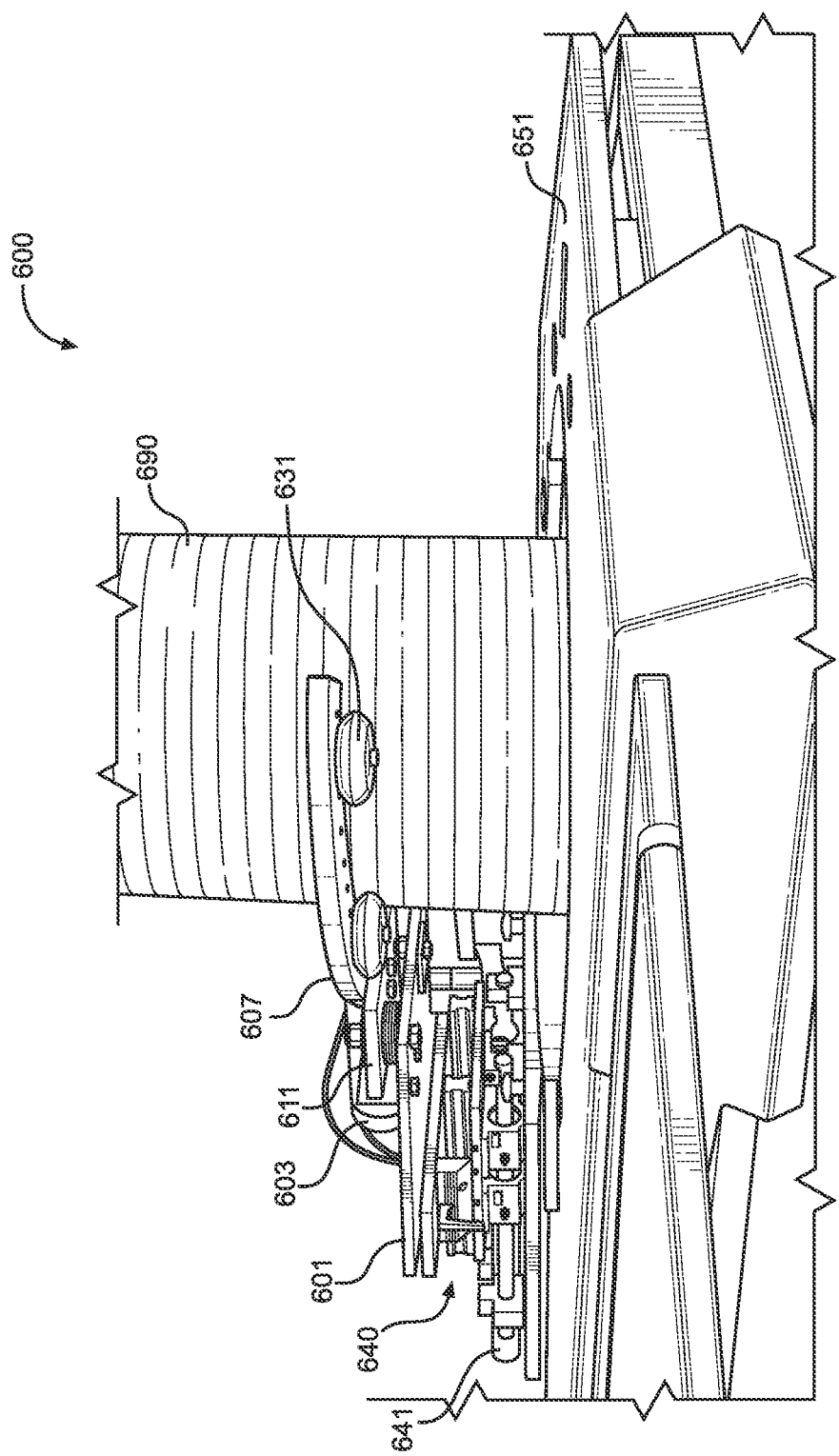
FIG. 6 shows a diagram of an exemplary multi-axis self-climbing tree trimmer system, according to one embodiment of the present disclosure.

FIG. 6 shows a diagram of an exemplary multi-axis self-climbing tree trimmer system, according to one embodiment of the present disclosure. Diagram 600 shows platform 651 supporting motorized carrier 640. As depicted in FIG. 6, platform 651 encircles tree 690. Tree 690 may be a palm tree or other type of tree that may be maintained by occasional trimming of the trunk of tree 690. Articulating arm 607 is shown engaged with tree 690 with depth control element 631 controlling the maximum depth any of the cutting tools (not shown) of articulating arm 607 cuts into the fronds of the trunk of tree 690. Articulating arm 607 is connected to pivoting connector plate 611, which is driven by the extendable piston element (not shown) extending from actuator 603. Actuator 603 is mounted on base 601. Pivoting connector plate 611 is pivotally mounted on base 601. Base 601 is mounted on motorized carrier 640. Motorized carrier 640 is configured to move along platform 651. The motion of motorized carrier 640 along platform 651 may be a lateral motion carrying the trimming assembly around the trunk of tree 690. In some embodiments, motorized carrier 640 may move substantially around the trunk of tree 690.

Motorized carrier 640 includes track 641. Track 641 allows the multi-axis self-climbing tree trimmer system to move the trimming assembly towards the trunk of tree 690 for engaging and trimming and move the trimming assembly away from the trunk of tree 690 after articulating arm 607 and articulating arm 609 (not shown) have disengaged from the trunk of tree 690. As motorized carrier 640 moves laterally along platform 651, motorized carrier 640 maintains track 641 in a substantially radial orientation with respect to the trunk of tree 690. In some embodiments, track 641 may include a single track for guiding the trimming assembly towards and away from the trunk of tree 690. In other embodiments, track 641 may include two or more tracks for guiding motion of the trimming assembly.

Figure 7:
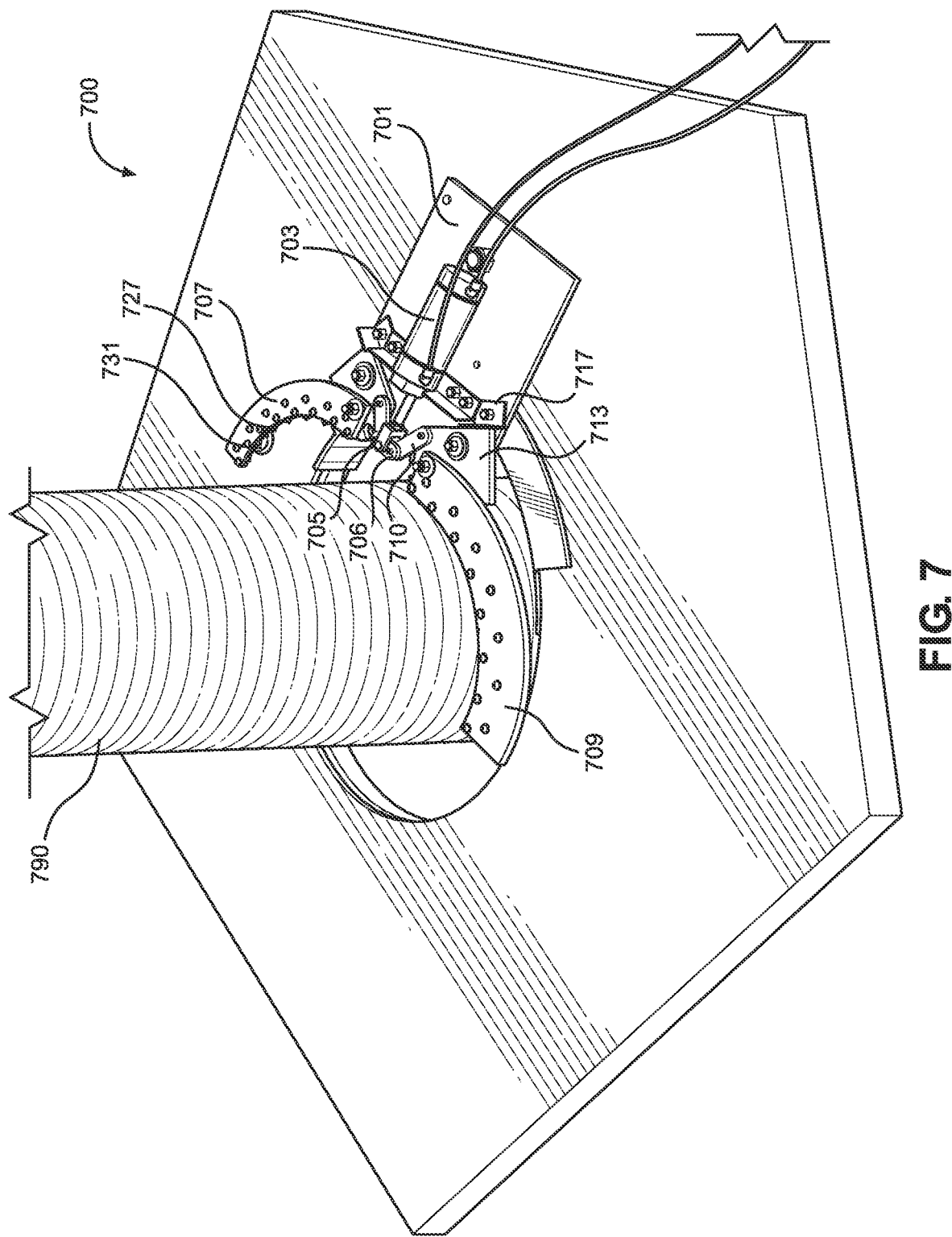
FIG. 7 shows a diagram depicting an exemplary multi-axis self-climbing tree trimmer system, according to one embodiment of the present disclosure.

FIG. 7 shows a diagram depicting an exemplary multi-axis self-climbing tree trimmer system, according to one embodiment of the present disclosure. Diagram 700 shows the trimming assembly in an open configuration with the central opening between articulating arm 707 and articulating arm 709 maximized. As depicted in FIG. 7, extendable piston element 705 is extended away from actuator 703. This position of extendable piston element 705 positions connecting bar 706 away from actuator 703 causing articulating element 710 to pull pivoting connector plate 713. The position of pivoting connector plate 713 causes articulating arm 709 to have a position maximizing the distance between the terminal end of articulating arm 707 and the terminal end of articulating arm 709. Corresponding positions and interactions of elements of the trimming assembly cause articulating arm 707 to move away from the trunk of tree 790, maximizing the central opening between articulating arm 707 and articulating arm 709. Diagram 700 shows cut depth control element 731 and cutting tool 727 disengaged from tree 790.

Figure 8:
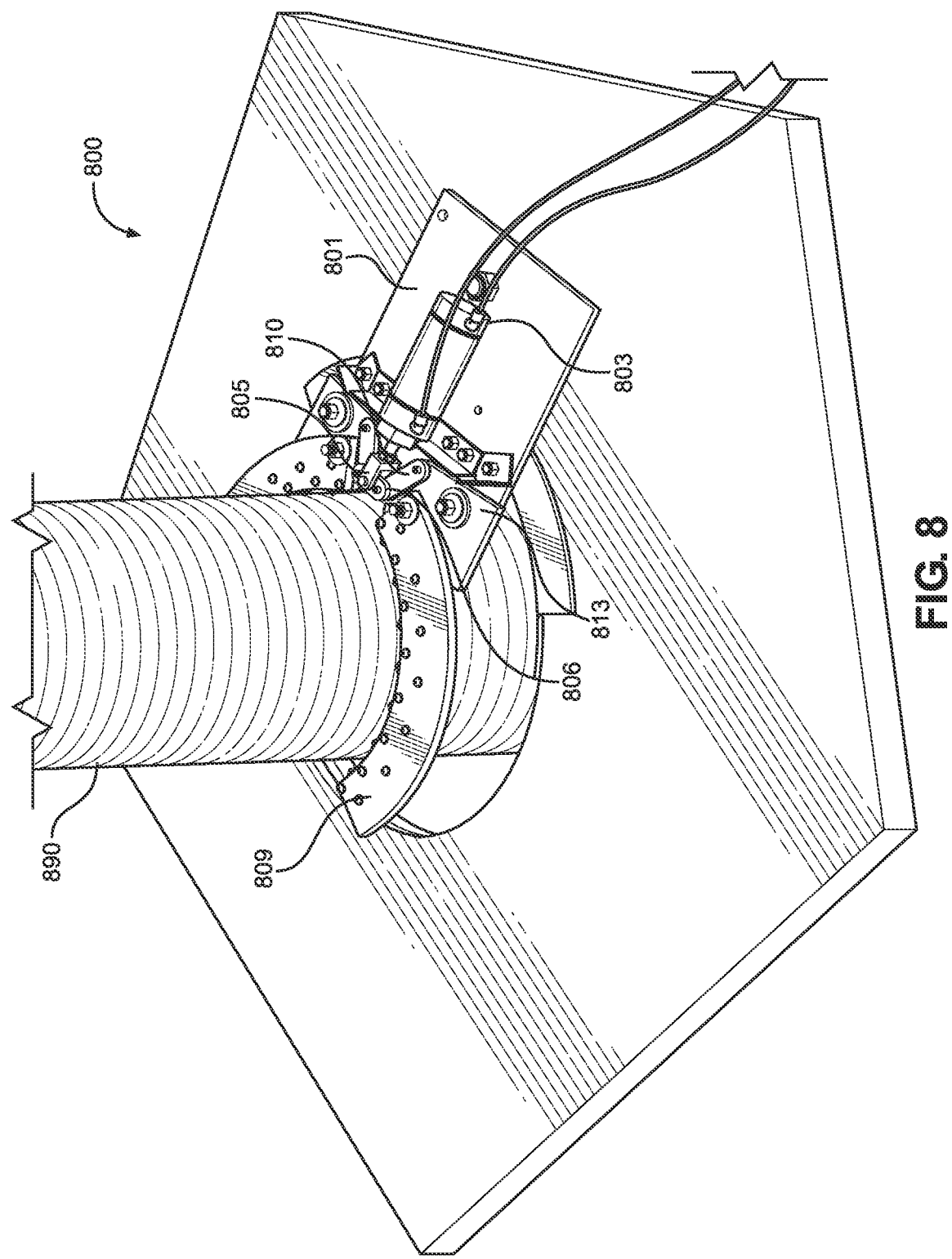
FIG. 8 shows a diagram depicting an exemplary multi-axis self-climbing tree trimmer system, according to one embodiment of the present disclosure.

FIG. 8 shows a diagram depicting an exemplary multi-axis self-climbing tree trimmer system, according to one embodiment of the present disclosure. Diagram 800 shows the trimming assembly in a closed configuration with articulating arm 807 and articulating arm 809 engaged with the trunk of tree 890. As depicted in FIG. 8, extendable piston 805 is retracted by actuator 803, positioning connecting bar 806 near to actuator 803 and positioning articulating element 810 to rotate pivoting connector plate 813. The position of pivoting connector plate 813 causes articulating arm 809 to have a position engaged with the trunk of tree 890. Corresponding positions and interactions of elements of the trimming assembly cause articulating arm 807 to engage with the trunk of tree 890. As depicted in FIG. 8, the circumference of tree 890 is different than the radial curvature of the concave side of articulating arm 807 and articulating arm 809. The depth to which the cutting tools of the trimming assembly penetrate the material to be trimmed is controlled by the cut depth control elements of the trimming assembly (not visible in this view).

From the above description, it is manifest that various techniques can be used for implementing the concepts described in the present application without departing from the scope of those concepts. Moreover, while the concepts have been described with specific reference to certain implementations, a person having ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. An assembly for trimming a tree comprising:
   a motorized carrier configured to move laterally allowing the motorized carrier to begin at a first position and move in a first direction substantially around a circumference of a trunk of the tree; and
   a trimming portion removably coupled to the motorized carrier, said trimming portion comprising:
   a base;
   an actuator attached to the base, the actuator comprising an extendable piston element;
   a first articulating arm pivotally attached to the base and connected to the extendable piston element, the first articulating arm having a curved configuration including a concave edge and a convex edge, wherein the first articulating arm includes one or more cutting tools extending from the concave edge to contact a portion of the tree to be trimmed, wherein a cutting side of the first articulating arm is in an open configuration when the extendable piston element is in a retracted configuration and in a closed configuration when the extendable piston element is in an extended configuration; and
   a second articulating arm pivotally attached to the base and connected to the extendable piston element, the second articulating arm having a curved configuration including a concave edge and a convex edge, wherein the second articulating arm includes one or more cutting tools extending from the concave edge to contact a portion of the tree to be trimmed, and wherein the second articulating arm is opposite the first articulating arm such that the first articulating arm and the second articulating arm form a central opening and are moveable between the open configuration and the closed configuration, wherein in the open configuration, the trunk of the tree is receivable within the central opening, and wherein in the closed configuration, the first articulating arm and the second articulating arm engage the trunk of the tree for the trimming;
   wherein the first articulating arm and the second articulating arm move independently of each other.

2. The assembly of claim 1, wherein when the extendable piston element extends, the first articulating arm and the second articulating arm move to the open configuration, and wherein when the extendable piston element retracts, the first articulating arm and the second articulating arm move to the closed configuration so that the one or more cutting tools engage with a surface of the trunk of the tree.

3. The assembly of claim 2, wherein the first articulating arm and the second articulating arm each further comprises a cut depth cut control element to control a depth the cutting tools engage the portion of the tree to be trimmed.

4. The assembly of claim 1, wherein the base is movably mounted to the motorized carrier and can be moved from a retracted position to an engaged position, wherein the engaged position extends the base towards the trunk of the tree to be trimmed and positions the first articulating arm so that the one or more cutting tools engage with a portion of the tree to be trimmed.

5. The assembly of claim 1, wherein the actuator is one of a pneumatic cylinder and a hydraulic cylinder.

6. The assembly of claim 1, wherein the base further comprises at least one bracket element to limit the open configuration of the first articulating arm and the second articulating arm at a maximum aperture.

7. The assembly of claim 1, wherein the base further comprises a wheel element that contacts the trunk of the tree when the trimming portion is deployed for the trimming.

8. The assembly of claim 1, wherein the one or more cutting tools of the trimming portion is one of a slicer, a cutter, a grinder, a carver, a router, a sander, a peeler, a rasp, and an abrader, a laser cutting tool, an etching tool, a burning tool, or any combination thereof.

9. The assembly of claim 1, further comprising a control system for controlling operation of the trimming portion.

10. The assembly of claim 1, wherein the first articulating arm and the second articulating arm are each comprised of a lower plate and an upper plate coupled together with a plurality of screws, wherein a first end of the one or more cutting tools is sandwiched between the two plates and a second end of the one or more cutting tools protrudes out of an inner curve of the first articulating arm and the second articulating arm for engaging the portion of the tree to be trimmed, wherein the one or more cutting tools are removable after loosening the plurality of screws such that the one or more cutting tools are replaceable.

11. The assembly of claim 1, wherein the motorized carrier moves laterally along a platform around the tree in one of a clockwise direction and a counterclockwise direction.

12. The assembly of claim 1, wherein the motorized carrier is further configured to navigate along the trunk of the tree so that the trimming portion of the assembly cuts patterns into the trunk of the tree.

13. A system for trimming a tree, comprising:
   a self-climbing platform;
   a motorized carrier disposed on a top surface of the self-climbing platform; and
   a trimming portion removably coupled to the motorized carrier, the trimming portion comprising:
      a base removably attached to the motorized carrier;
      an actuator attached to the base the actuator comprising an extendable piston;
      a first articulating arm having a curved configuration to receive a trunk of the tree, wherein the curved configuration is arranged such that a curvature of the first articulating arm complements a curvature of the trunk of the tree;
      a second articulating arm and having a curved configuration, the second articulating arm positioned opposite the first articulating arm so that the first articulating arm and the second articulating arm form a central opening and are moveable between an open configuration and a closed configuration, wherein when the first and second articulating arm are in the open configuration, the trunk of the tree is receivable within the central opening, and wherein when the first and second articulating arm are in the closed configuration, the first articulating arm and the second articulating arm substantially encircle the trunk of the tree;
      wherein the first articulating arm and the second articulating arm each include a cutting tool interchangeably attached for contacting the trunk of the tree to effect the trimming of the trunk of the tree; and
      a wheel element attached to the base, wherein the wheel element directly contacts the trunk of the tree and serves as an indicator of pressure exerted by the actuator;
      wherein the extendable piston element of the actuator is coupled to the first articulating arm and the second articulating arm, wherein when the extendable piston element extends, the first articulating arm and the second articulating arm move to the open configuration, and wherein when the extendable piston element retracts, the first articulating arm and the second articulating arm move to the closed configuration so that the plurality of cutting tools engage with a surface of the trunk of the tree, wherein the first articulating arm and the second articulating arm move independently of each other; and
      wherein the first articulating arm and the second articulating arm each further comprise one or more cut depth control elements for controlling the depth of engagement of the cutting tools.

14. The system of claim 13, wherein the self-climbing platform substantially encircles the trunk of the tree and the top surface of the self-climbing platform has an inner circumference that is larger than a trunk circumference of the tree.

15. The system of claim 14, wherein the motorized carrier includes a base positioned along a portion of the inner circumference of the self-climbing platform, wherein the motorized carrier moves in one of a clockwise direction and a counterclockwise direction.

16. The system of claim 13, wherein the plurality of cutting tools of the trimming portion is at least one of a slicer, a cutter, a grinder, a carver, a router, a sander, a peeler, a rasp, and an abrader, a laser cutting tool, an etching tool, a burning tool, or any combination thereof.

17. A method of trimming a tree, said method comprising:
   providing a tree trimming assembly, the tree trimming assembly comprising:
      a self-climbing platform;
      a motorized carrier disposed on at least a top surface of the self-climbing platform; and
      a trimming portion removably coupled to the motorized carrier, the trimming portion comprising:
         a base removably attached to the motorized carrier;
         an actuator attached to the base, the actuator comprising an extendable piston element that is extendable;
         a first articulating arm having a curved configuration to receive a tree trunk or adjacent peripheral growth of the tree;
         a second articulating arm and having a curved configuration positioned opposite the first articulating arm so that the first articulating arm and the second articulating arm form a central opening and are moveable between an open configuration and a closed configuration, wherein in the open configuration, the trunk of the tree is receivable within the central opening, and wherein in the closed configuration, the first articulating arm and the second articulating arm substantially encircle the trunk of the tree;
         a plurality of cutting tools interchangeably attached to each of the first articulating arm and the second articulating arm to contact the trunk of the tree or adjacent peripheral growth of the tree to effect cutting or the trimming of the trunk of the tree or adjacent peripheral growth of the tree; and
         a wheel element attached to the base, wherein the wheel element directly contacts the trunk of the tree and serves as an indicator of pressure exerted by the actuator;
         wherein the extendable piston element of the actuator is coupled to the first articulating arm and the second articulating arm, wherein when the extendable piston element extends, the first articulating arm and the second articulating arm move to the open configuration, and wherein when the extendable piston element retracts, the first articulating arm and the second articulating arm move to the closed configuration so that the plurality of cutting tools engage with a surface of the trunk of the tree, wherein the first articulating arm and the second articulating arm move independently of each other; and
         wherein the first articulating arm and the second articulating arm each further comprise one or more wheels to control a cut depth and eliminate resistance from the first articulating arm so that rotational friction comes from the plurality of cutting tools cutting into the trunk of the tree or adjacent peripheral growth;

mounting the tree trimming assembly to the trunk of the tree, wherein the self-climbing platform substantially encircles the trunk of the tree;

climbing the trunk of the tree with the self-climbing platform to a desired location of the trunk of the tree for the trimming;

driving the motorized carrier to a starting point of the tree;

activating the actuator by extending the extendable piston element so that the first articulating arm and the second articulating arm in the open configuration to receive the trunk of the tree;

retracting the extendable piston element so that the first articulating arm and the second articulating arm are in the closed configuration substantially encircling the trunk of the tree;

aligning and centering the first articulating arm and second articulating arm by adjusting the pressure of the actuator, thereby ensuring that the one or more wheels of the first articulating arm and the second articulating arm, the wheel element of the base, and the plurality of cutting tools are in direct contact with the trunk of the tree;

driving the motorized carrier on the self-climbing platform in one of a clockwise direction and a counter-clockwise direction; and trimming the tree by cutting the adjacent peripheral growth of the tree by engaging the trunk of the tree with the plurality of cutting tools.

18. The method of claim 17, wherein the plurality of cutting tools of the trimming portion is at least one of a slicer, a cutter, a grinder, a carver, a router, a sander, a peeler, a rasp, and an abrader, a laser cutting tool, an etching tool, and a burning tool.

* * * * *